Jan. 3, 1933.　　　J. W. L. WARREN　　　1,893,257
MILKING MACHINE
Filed Oct. 30, 1929
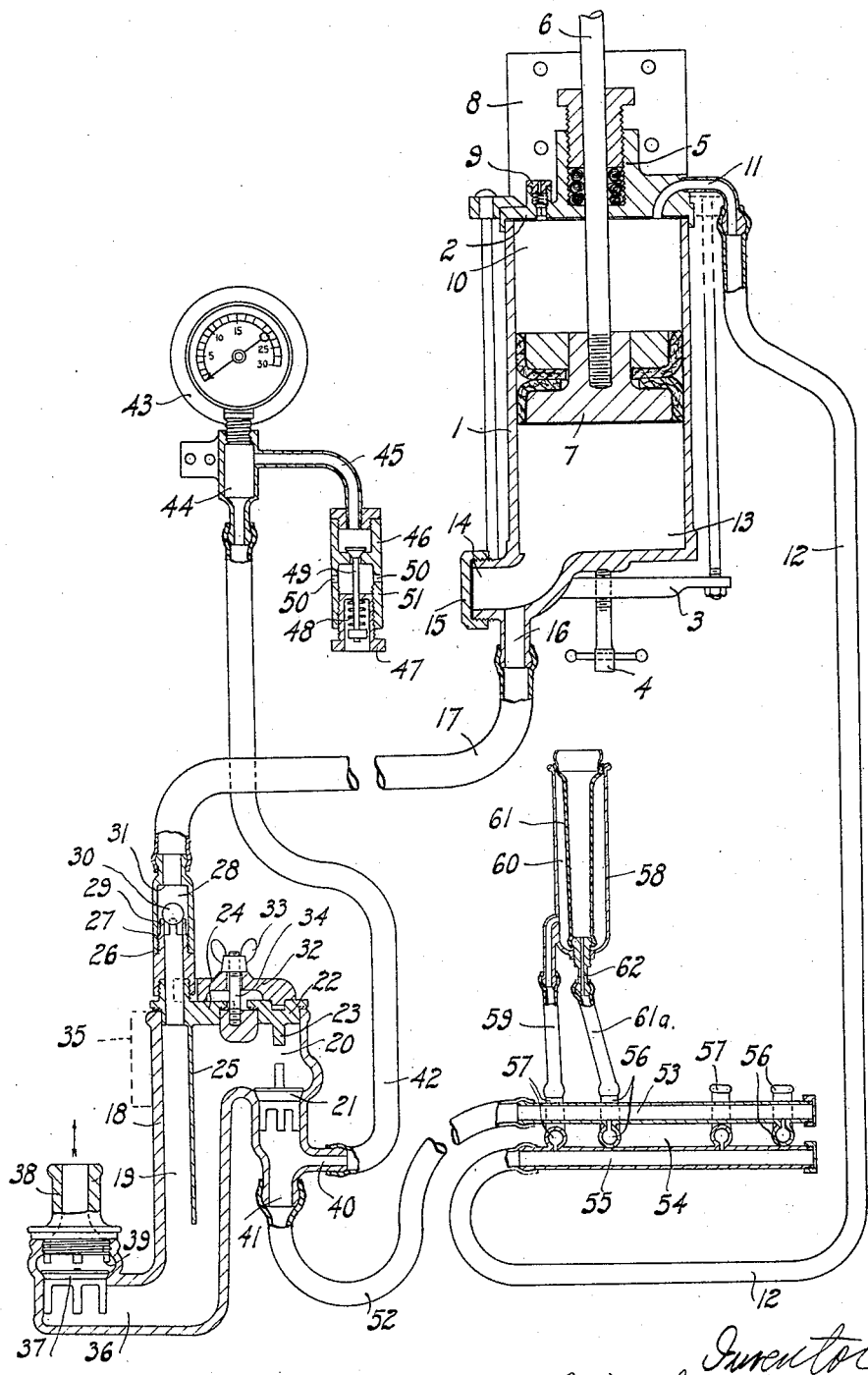
Inventor
John Wilfred Llewellyn Warren
By B. Singer, atty.

Patented Jan. 3, 1933

1,893,257

UNITED STATES PATENT OFFICE

JOHN WILFRED LLEWELLYN WARREN, MOUNT ALBERT, AUCKLAND, NEW ZEALAND

MILKING MACHINE

Application filed October 30, 1929, Serial No. 403,559, and in Australia November 15, 1928.

This invention relates to milking machines of the type wherein the suction and compression action of a piston reciprocating in a cylinder is utilized at one end of the cylinder to create alternate vacuum and pressure thereby drawing milk into a suitably positioned valve chamber and expelling same therefrom into the atmosphere, and at the other end of the said cylinder to create alternate vacuum and pressure to effect pulsations of the teat cup inflations.

The object of the present invention is generally to provide improvements in the working of such apparatus and in particular the provision of means for preventing the passage of any fluid to the cylinder itself when the valve and milk chamber becomes flooded as for instance when, after milking, the teat cups are placed in a bucket of water for cleaning purposes allowing the machine to draw a much larger volume of fluid than is normally the case during the milking process.

In describing a constructional embodiment of the invention, reference will be made to the accompanying drawing, which diagrammatically illustrates the complete layout of the machine.

The invention comprises a cylinder 1 clamped to a cylinder cover 2 by such means as bridle 3 with clamping screw 4, the cover 2 being provided with a gland 5 through which the piston rod 6 passes to piston 7 of suitable type, the cover 2 having an attaching plate 8, by means of which the cylinder 1 is suitably fastened to a baseplate or like, piston 7 receiving its reciprocating motion by means of its rod 6 being connected through (not shown) a suitable connecting rod to an eccentric, crank or the like mounted on a drive shaft.

The cylinder cover 2 is provided with a relief valve 9 for permitting escape of excess pressure at the top end 10 of cylinder 1, the cover 2 also having a branch pipe 11 for the connection thereto of the pulsation pipe or tube 12.

The bottom end 13 of cylinder 1 is provided with a branch pipe 14 with plug or cover 15, the branch 14 having a further branch 16 from which the tube 17 passes to the valve and milk chamber apparatus 18.

This valve and milk chamber apparatus 18 comprises a vertical cylindrical milk chamber 19 having an upper side extension 20 in which a suction valve 21 is housed, above the said valve 21 there being a suitably seated cover 22 with valve stop 23 for preventing excess lift of valve 21.

At the top of the cylindrical milk chamber 19 there is fitted a suitably seated cover 24 having a central baffle plate 25 which projects down into the milk chamber 19 and faces the chamber side extension 20, so that the incoming fluid past suction valve 21, tends to pass directly down to the bottom of the chamber 19, and not to the check valve 26 which is connected to and above the cover 24 at the side of the baffle plate 25 away from the chamber extension 20.

This check valve 26 comprises a body 27 to the upper end of which is connected the tube 17 and within the bore 28 of this body 27 there are prongs 29 on which a ball valve 30 is supported at a predetermined distance below an upper seating 31 and away from the sides of the bore 28.

The covers 22 and 24 are clamped to the top of the valve and milk chamber apparatus 18 by such means as a saddle 32 clamped down by wingnut 33 and stud 34, the said apparatus 18 also having a suitably situated flange 35 for fastening the apparatus 18 to any suitable support.

To the bottom of the milk chamber 19 there is a side extension 36 in which is housed the delivery valve 37 over which there is the delivery connection 38 with stops 39 to prevent excess lift of valve 37, this delivery connection 38 having a tube connected thereto (not shown) for disposal of the milk as desired.

Below the suction valve 21 there are branches 40 and 41 on the valve and milk chamber apparatus 18, branch 40 being connected by tube 42 to the vacuum gauge 43 and mounting 44 and branch pipe 45 from which it passes to an adjustable vacuum relief valve 46 having an adjusting screw 47 for increasing or reducing as desired, the compression spring 48 applied to the valve 49, ports 50 being situated in the valve body 51.

The branch 41 is connected by tube 52 to the suction pipe 53 of the claw 54 the pulsation pipe 55 of the claw 54 being connected to tube 12.

This claw 54 has, as is general practice, suction branches 56 and pulsation branches 57, each teat cup 58 having a tube 59 connecting the annular space 60 surrounding its inflation 61 to a pulsation branch 57 and a tube 61a connecting its suction nipple 62 to a suction branch 56.

In operation, considering in the first case an up stroke of the piston 7, that is to say, a stroke wherein the piston 7 moves towards cylinder cover 2.

This stroke causes a partial vacuum to be created at cylinder end 13 and also in the milk chamber 19, by way of tube 17, in the suction pipe 53 of the claw 54, by tube 52 and in the center of teat cup 58 by way of tube 61a and nipple 62.

Thus suction is applied to the cow's teat, (not shown), within cup 58 and the milk drawn through tube 61a, suction pipe 53, tube 52 and past suction valve 21, into the milk chamber 19, where the baffle plate 25 deflects it to the bottom of the said chamber 19.

Simultaneously, during the said up stroke of piston 7, pressure is created in the top end 10 of the cylinder 1, and also by tube 12 to the pulsation pipe 55 of claw 54, and to the annular space 60, surrounding the inflation 61 of teat cup 58 by way of tube 59, this pressure causing contraction of the inflation 61 around the cow's teat (not shown) therewithin.

Thus it will be seen that during this said up stroke of piston 7, the inflation 61 contracts or squeezes the cow's teat while the suction therebelow draws the milk therefrom.

Now, considering the return stroke of the piston 7, that is to say, when the said piston 7 moves away from the cylinder cover 10.

This causes breaking of the partial vacuum created by the previous up stroke, and the making of pressure within milk chamber 19, which forces the milk contained therein past the delivery valve 37 and out of the delivery pipe 38 for disposal as desired.

Simultaneously, during the said return stroke of piston 7, a partial vacuum is created in the top end 10 of the cylinder 1, and also by tube 12 to pulsation pipe 55, and by tube 59 to the annular space 60 surrounding the inflation 61, the effect of this partial vacuum being to cause the said inflation 61 to expand and release its squeezing action of the cow's teat.

Thus it will be seen that during the said return stroke of piston 7, the milk is simultaneously delivered from the milk chamber 19, and the squeezing action of the inflation 61 on the cow's teat, relaxed, but due to the suction valve 21 remaining closed, there is sufficient vacuum retained in the tube 52, suction pipe 53 of claw 54, and tube 61a, to keep the teat cup 58 from falling off the cow's teat.

At such times when the pressure in the top end 10 of the cylinder 1 exceeds what is desired due to leakage of the gland 5 or other parts, the relief valve 9 permits escape of the excess during the up stroke of piston 7.

The degree of vacuum is also controlled by vacuum relief valve 46, connected through mounting 44 and tube 42 to branch 40 of the valve and milk chamber apparatus 18, reference to vacuum gauge 43 showing the degree of vacuum and adjustment of the compression of spring 48 on valve 49 by adjustment screw 47 enabling ingress of air through ports 50, past valve 49 when the degree of vacuum is in excess of that desired.

During normal operation of the plant, air only passes backwards and forwards past the ball valve 30, and this is not sufficient owing to the high velocity of gases when compared with fluids to lift the said ball valve 30 from the prongs 29, but when abnormal conditions arise and fluid attempts to pass the ball valve 30, its comparative slow velocity causes a banking up of the suction caused by the piston 7 during its up stroke, and this banking up of suction causes the valve 30 to lift from the prongs 29 until it rests on the seating 31, preventing during the rest of that particular stroke, passage of fluid to the cylinder 1 bottom end 13, the return downward stroke of piston 7, forcing the ball valve 30 downwardly from seating 31 on to its supporting prongs 29, and the fluid which attempted to pass the ball valve 30 is forced from chamber 19 out past the delivery valve 37.

I claim:

In combination with a pump having a cylinder and a piston, a teat cup connected to one end of the cylinder and having an inflation element therein, a milk collecting chamber having a suction duct 22 connected to the other end of the pump cylinder and provided with a check valve constructed and arranged to permit passage of air through the suction duct in either direction and to prevent passage of milk therethrough to the pump, said chamber being further provided at the lower side with an intake duct connected for suction to the inflation element of the teat cup and provided with a check valve, said chamber being also provided with a baffle extending downwardly therein at the base of the first named duct, and with an extension pipe provided with a discharge nipple and a check valve, the pump serving during the movement of its piston toward the end of the cylinder to which the teat cup is connected to draw the milk from the teat cup into the milk collecting chamber and during the reverse stroke of the piston to force milk under pressure out from said milk collecting chamber to atmosphere.

JOHN WILFRED LLEWELLYN WARREN.